(12) United States Patent
Kovarik

(10) Patent No.: US 12,378,790 B2
(45) Date of Patent: *Aug. 5, 2025

(54) APPARATUS FOR REMOVING A LAYER OF SEDIMENT WHICH HAS SETTLED ON THE BOTTOM OF A LARGE WATER BODY

(71) Applicant: Pond Mower, LLC, Englewood, CO (US)

(72) Inventor: Joseph E. Kovarik, Englewood, CO (US)

(73) Assignee: Joseph E. Kovarik, Englewood, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/956,492

(22) Filed: Nov. 22, 2024

(65) Prior Publication Data

US 2025/0084658 A1    Mar. 13, 2025

Related U.S. Application Data

(60) Division of application No. 18/532,158, filed on Dec. 7, 2023, now Pat. No. 12,158,019, which is a continuation-in-part of application No. 17/475,611, filed on Sep. 15, 2021, now Pat. No. 11,851,908, which is a continuation of application No. 16/542,364, filed on Aug. 16, 2019, now Pat. No. 11,124,981, which is a continuation of application No. 15/665,779, filed on Aug. 1, 2017, now Pat. No. 10,385,581, which is a continuation of application No. 14/694,129, filed on Apr. 23, 2015, now Pat. No. 9,732,537, which is a continuation of application No. 13/404,170, filed on Feb. 24, 2012, now Pat. No. 9,016,290.

(Continued)

(51) Int. Cl.
  *E04H 4/16* (2006.01)
  *C02F 1/00* (2023.01)
  *C02F 103/00* (2006.01)

(52) U.S. Cl.
  CPC .......... *E04H 4/1636* (2013.01); *C02F 1/001* (2013.01); *C02F 2103/007* (2013.01); *C02F 2201/008* (2013.01); *C02F 2301/08* (2013.01); *C02F 2303/24* (2013.01)

(58) Field of Classification Search
  None
  See application file for complete search history.

(56) References Cited

U.S. PATENT DOCUMENTS

| | | |
|---|---|---|
| 6,469 A | 5/1849 | Lincoln |
| 5,524,320 A | 6/1996 | Zachhuber |

(Continued)

*Primary Examiner* — Eric W Golightly
(74) *Attorney, Agent, or Firm* — Sheridan Ross P.C.

(57) ABSTRACT

A method and apparatus for removing a layer of sediment which has settled on the bottom of a large water body includes using a structural frame configured to contain a bottom water flow and for containing liquid and suspended particles dispersed during removal of bottom sediment in a suctioning area that is at least about 3 square feet, up to and including 8 square feet, that has support elements and/or silt containing elements, with a plurality of supporting wheels. A sediment removing vacuum unit is operably associated with the structural frame to conduct suctioned bottom water flow through suction lines to a filtering station outside of the water body, such that the water can then be returned to the large water body.

18 Claims, 6 Drawing Sheets

Related U.S. Application Data

(60) Provisional application No. 61/471,506, filed on Apr. 4, 2011, provisional application No. 61/446,282, filed on Feb. 24, 2011.

(56) References Cited

U.S. PATENT DOCUMENTS

| | | |
|---|---|---|
| 5,553,972 A | 9/1996 | Bergeron |
| 5,995,884 A | 11/1999 | Allen |
| 7,181,871 B2 | 2/2007 | Sower |
| 7,805,793 B2 | 10/2010 | Paxton |
| 8,465,651 B2 | 6/2013 | Fischmann |
| 8,753,520 B1 | 6/2014 | Fischmann |
| 8,926,221 B2 | 1/2015 | Hwang |
| 9,016,290 B2 | 4/2015 | Kovarik et al. |
| 9,062,471 B2 | 6/2015 | Fischmann |
| 9,080,342 B2 | 7/2015 | Fischmann |
| 9,470,007 B2 | 10/2016 | Fischmann et al. |
| 9,470,008 B2 | 10/2016 | Fischmann et al. |
| 9,708,822 B2 | 7/2017 | Fischmann et al. |
| 9,732,537 B2 | 8/2017 | Kovarik et al. |
| 9,957,693 B2 | 5/2018 | Fischmann Torres |
| 10,385,581 B2 | 8/2019 | Kovarik et al. |
| 11,124,981 B2 | 9/2021 | Kovarik et al. |
| 11,851,908 B2 | 12/2023 | Kovarik |
| 12,158,019 B2 | 12/2024 | Kovarik |
| 2002/0117430 A1 | 8/2002 | Navarro et al. |
| 2005/0247613 A1 | 11/2005 | Bishop |
| 2012/0024794 A1 | 2/2012 | Fischmann T. |

APPARATUS FOR REMOVING A LAYER OF SEDIMENT WHICH HAS SETTLED ON THE BOTTOM OF A LARGE WATER BODY

RELATED APPLICATION

This application is a divisional of U.S. patent application Ser. No. 18/532,158, filed Dec. 7, 2023 (now U.S. Pat. No. 12,158,019, issued Dec. 3, 2024), which is a continuation-in-part of U.S. patent application Ser. No. 17/475,611, filed Sep. 15, 2021 (now U.S. Pat. No. 11,851,908, issued Dec. 26, 2023), which is a continuation of U.S. patent application Ser. No. 16/542,364, filed on Aug. 16, 2019 (now U.S. Pat. No. 11,124,981, issued Sep. 21, 2021), which is a continuation of Ser. No. 15/665,779, filed Aug. 1, 2017 (now U.S. Pat. No. 10,385,581, issued Aug. 20, 2019), which is a continuation of U.S. patent application Ser. No. 14/694,129, filed Apr. 23, 2015 (now U.S. Pat. No. 9,732,537, issued Aug. 15, 2017) (now abandoned), which is a continuation of U.S. patent application Ser. No. 13/404,170, filed on Feb. 24, 2012 (now U.S. Pat. No. 9,016,290, issued Apr. 28, 2015), and which claims priority from U.S. Provisional Patent Application No. 61/446,282 filed Feb. 24, 2011 and U.S. Provisional Patent Application No. 61/471,506 filed on Apr. 4, 2011. The entire disclosure of the prior applications is considered to be part of the disclosure of the accompanying application and is hereby incorporated by reference.

FIELD OF THE INVENTION

A method and apparatus for removing a layer of sediment which has settled on the bottom of a large water body includes using a structural frame configured to contain a bottom water flow that has a control zone configured for containing liquid and suspended particles dispersed during removal of bottom sediment in a suctioning area that is at least about 3 square feet, up to and including 8 square feet, that has support elements and/or silt containing elements depending from the frame, with a plurality of wheels for additional support.

BACKGROUND OF THE INVENTION

Numerous devices for removing sediment from ponds, lakes, streams, lagoons, and the like are known in the prior art. These vary from large trucks fitted with huge pumps and vacuums, to garden hose devices purportedly capable of creating suction sufficient to remove silt and debris from the bottom of a pond/lagoon. Neither of these extremes is sufficient for a residential pond/lagoon owner or for a pond servicing service where routine and periodic servicing of ponds of 8 feet wide to about 1 acre is involved.

Pond vacuums are popular with many water gardeners because of their convenience and ease of use. Such pond vacuums are primarily designed so that their motors remain out of the water but are positioned near the water's edge and used for cleaning algae blooms, fish waste, dead leaves, and other dirt that may collect at the bottom of the pond. Problems also exist in the use of such devices, including difficulties with respect to access to deeper portions of ponds, vacuum suction loss due to long tubes or pipes from the motor to the debris at the bottom of the pond, efficiencies of pumping action and ability to distribute and/or filter debris after removal from the pond; return of dirty water back to a pond, etc. Even other designs that employ submergible vacuums suffer from various deficiencies, including the absence of any support for a suction device above the bottom of a pond, especially the lack of any supports that have adjustable elevations, are able to maneuver around underwater obstacles (such as submerged potted plants) etc.

Existing gravity-fed bottom drainage systems have a number of disadvantages that make them unsuitable for the average domestic pond keeper. For example, they are extremely expensive, difficult to install into existing ponds, require a large installation area, have inaccessible pipe joints in the pond base and walls, and it is difficult to draw solid waste upwards out of the pond once such solids accumulate and such accumulation decays and pollutes the water quality.

There is therefore a long felt but unsolved need for a relatively simple and effective device, system and method for cleaning the bottom of ponds, especially lined ponds.

Aside from more traditional ponds, however, there exists a desire for large bodies of water designed to facilitate recreational beach-like activities, collectively described herein as lagoons, which similar to lined ponds, have to be cleaned to maintain a clean looking appearance. Thus, large bodies of water may comprise man-made lagoons that possess publicly accessible urban beaches that provide the look and feel of a tropical beach with clear waters and sandy beaches. Such a lagoon then draws upon other business ventures, including entertainment, educational, sports, and/or commercial venues. Indeed, beaches have been found to be one of the preferred destinations for people all over the world. Many beaches, however, despite being on a shoreline, are not suitable for swimming, are very windy, have dark sand, and/or present safety concerns in terms of currents, surf, marine life, rocks, and/or other associated risks. This creates a situation where many people do not swim or practice water sports in or around such beaches. People dream of white sandy beaches with tropical turquoise-colored waters where they can swim, enjoy water sports, sailing, rowing, windsurfing, water skiing, stand up paddling, jet skiing and kitesurfing, among others etc. Such water sports cannot be practiced in backyard or community pools. Conventional swimming pools simply do not allow for the incorporation of these idyllic beach amenities. Moreover, the operation of typical pools requires the filtering of the complete water volume contained in the pool 4 times per day, and also requires maintaining a permanent residual chlorine level of at least 1.0 ppm in the complete water volume according to regulations in Florida such as Rule 64E-9 from the Florida Department of Health). Operating costs of large pools are high and become economically prohibitive, due to an intensive electricity consumption to filter the complete water volume many times per day, and due to the use of chlorine to maintain a high and permanent chlorine level. Therefore, pools have a very high carbon footprint, which impacts the sustainability of such structures.

There is therefore a long felt but unsolved need for a method and system for removing a layer of sediment which has settled on the bottom of a large water body that does not entail the problems faced with traditional pool cleaning/filtering operations.

SUMMARY OF THE INVENTION

The present invention is generally directed to a system, device and method for removing a layer of sediment formed on the bottom of a pond or lagoon. While certain embodiments are referred to as the "Pond Mower" due to some visual similarities of the present invention (in certain designs) to a traditional lawnmower, more preferred designs are far larger (at least 3 square feet, and preferably about 8 square feet) so as to traverse the bottom of a lined lagoon and suck up debris and silt deposited there in a far more energy and economically efficient manner as compared to traditional swimming pool filtering systems. In various embodiments, the present invention is directed principally to the removal of settled silt and debris on the bottom of large bodies of water-without the use of traditional central filtering systems, such that the energy requirements associated with maintaining the clarity of water are significantly reduced, without the discoloration effects of silt/debris on the bottom of large bodies of water. The present invention permits one to filter the water in a lagoon that contains the highest quantity of sediment therein, i.e. the sediment that has settled to the bottom of the lagoon. By doing so, and in contrast to conventional swimming pool filtering systems, the present technology permits one to filter far less, perhaps as much as 99% less, of the water contained in a very large body of water, while still removing the vast majority of sediment in the water, thus providing an energy and economically feasible way to enable a clean, large body of water.

Certain embodiments of the present invention are directed to man-made publicly accessible urban beach lagoons that can facilitate and attract the development of an entertainment complex, and/or educational, sports, and/or commercial facilities. Such embodiments center around a water treatment system arranged and configured to utilize at least 50% less electricity compared to a conventional swimming pool centralized filtration systems that filter the complete water volume 4 times per day.

As used herein, sediment includes any settable material which settles onto the bottom of a pond/lagoon and the like and includes sand, sludge, aquatic algae and the like which collect on the bottom of ponds or lagoons (such terms used interchangeably), especially those having a liner placed over the bottom of the to provide water containment. The present invention removes the sediment without injuring the liner. In one embodiment, the method comprises providing at least one sediment removing vacuum unit that, in one embodiment, preferably includes a frame supporting the same with at least one single wheel of at least 6 to 8 inches in diameter, more preferably about one foot in diameter, preferably positioned behind the bottom suction end of the unit by at least about 12 inches. Such elevation above a pond/lagoon bottom is preferably adjustable by various means, including wheel adjustment systems standard on lawnmowers.

Employing one of the several embodiments described herein, the process of removing a layer of sediment from the bottom of a pond/lagoon comprises positioning the apparatus on the bottom of a pond/lagoon with a layer of sediment on the bottom of the pond/lagoon such that the suction is sufficient to suck up pebbles and stones that weigh at least about that of a quarter, with a screen preferably mounted near the suction end to prevent passage of undesired sized debris from flowing through an in-line impeller. In other embodiments, however, instead of attempting to preclude larger debris from being suctioned up, one aspect of the present invention is directed to retaining such debris in a manner such that it is collected and contained for removal for disposal. Other embodiments both screen out certain larger sized particles while also suctioning up other material for either conveyance outside the pond/lagoon or into a retainment bag for later disposal.

One device that can be used in the present method is a pump system that is typically used to power water fountain features and in pond/lagoon skimming systems. Such pumps are available in various sizes and capacities and are generally powered by electricity provided by outlets having a GSI trigger fuse such that any dangerous conditions will cause electric power to cease, thus preventing electrocution in an aqueous environment. A suitable pump for the size of job or pond/lagoon is selected and preferably mounted on a frame to assist in conveyance of the device across a pond/lagoon floor. In one embodiment, a rigid segment of PVC or other similar plastic, metal or composite pipe, preferably at least 1 inch in diameter, more preferably at least 1.5 inches in diameter and even more preferably at least about 2 inches in diameter, is connected to each end of the pump. The segment associated with the suction end of the pump is preferably at least about 1 foot long, more preferably about 18-24 inches, and is adapted for connecting to a desired suction end-piece, shaped to address particular issues arising in a pond/lagoon cleaning endeavor. For example, various types and shapes of suction-apertured units can be associated with the suction-end segment, such as those that are typically used with wet-and-dry-vac units. One of skill in the art will appreciate how the configuration and shape of such an end unit will be suitable for the type and power of a pump being employed, e.g. a flat funnel shaped unit that spreads the suction force over an extended area; other units have brushes associated therewith to loosen material coming into contact with the brush; other suction apertures being adjustable (e.g. via a gate) to facilitate changing desired vacuum rates. In one embodiment, the device provides the operator with a rotatable variance gauge to adjust the aperture or diameter of the suction end of the device, such as by providing a telescoping-type end piece that can decrease the diameter of the suction tip.

A pipe or tube segment (i.e. second segment) associated with the non-suction end of the pump is preferably at least about 18 inches long, more preferably at least about 24-36 inches long, rendering it easy for a user to grasp the segment with both hands positioned above the mounted pump. In certain embodiments, one or both segments comprise a telescoping, adjustable nesting extension tube is employed. In a preferred embodiment, the two segments and pump are provided along a single axis such that the device is at least about 4 feet from end to end, more preferably at least about 4.5-6.5 feet in length, thus providing a device that can be relatively easily manipulated and carried by a single person. Handles can be mounted along the extent of the device to further facilitate manipulation and control of the device when being carried or while in use. Such handles can, for example, be provided such that one handle is provided either on the suction-end segment or on the pump itself, with another handle being provided along the second segment.

In a preferred embodiment, the device can be either fixedly or reversibly connected to an assembly designed to facilitate the conveyance of the device across a pond/lagoon bottom. In one embodiment, at least one, and in certain other embodiments, preferably two or more slats or runners are provided that are designed to ride either through or on top of the pond/lagoon bottom surface without unduly stirring up sediment or damaging a pond/lagoon liner. Other embodiments utilize at least one wheel to facilitate movement of the device across a pond/lagoon bottom and to further assist in the transport of the device to and from a pond/lagoon. Thus, in one embodiment, a dolly-like carriage is provided such that the suction device (and segments associated with the pump/vacuum device) can be positioned either in an upright position or tilted position, even when not in use. It can be angled in a desired fashion when submerged in the pond/lagoon and pushed and pulled as desired to suction up debris on the pond/lagoon bottom. The device can be reversibly associated with such a conveyance assembly to permit the operator to physically manipulate the device either with the benefit of either a ski or wheeled device, or alternatively, if weight concerns or underwater obstructions are of concern, without the possible cumbersome nature of a wheeled or ski-tracked associated unit.

The weight of the unit, at least the portion that is submerged, is preferably below about 60 lbs, more preferably below about 50 pounds, and most preferably less than about 45 lbs. It should be appreciated that because the device is used while being at least partially submerged in a pond/lagoon, the weight of the device seems less when in use, thus providing easier handling by a single operator. The combination of the relatively sleek design (e.g. preferably an in-line suction end, pump/vacuum and non-suction end) plus the relatively light weight of the device, provides a distinct advantage over prior art systems that are typically much heavier (relative to the suction power required to perform similar debris removal), are not submerged during use, fail to provide a powered suction pump/vacuum within feet of the pond/lagoon bottom, and/or have tubing and electrical cords that are not confined in an in-line fashion, thus allowing for the operator to become entangled, etc.

While certain situations and environments call for the vacuum unit to be submersible and in close proximity to the pond/lagoon bottom surface, in other embodiments of the present invention, the powered vacuum unit may be positioned outside the pond/lagoon (e.g. on its edge) or is in another position within the pond/lagoon or in an adjacent water container. One embodiment provides an operator with the option of either standing on the edge of a pond/lagoon and manipulating an elongated hand-held member connected to a submersible suction end, designed to come into close proximity to the pond/lagoon bottom; or to enter the pond/lagoon and suction debris from its bottom by positioning the suction end to desired locations. Certain prior art devices are not designed to permit an operator to enter the pond/lagoon to perform suctioning activities as the electrical cord connection and associated poles used to manipulate the vacuum unit are awkward and potentially dangerous if an operator attempted to enter the pond/lagoon with the same. For example, in a preferred embodiment of the present invention, the electrical cord is closely associated with at least the first or second segment such that the cord cannot be tripped over the operator, especially when pond/lagoon water is disturbed, obscuring visibility of the same. In some preferred embodiments, the electrical cord used with the present invention is itself made to be buoyant so that the operator, once in the pond/lagoon, does not become entangled in the cord by not seeing the submerged extent of cord while the suctioning operation is ongoing. Similarly, the long extended poles of certain prior art devices are ill-suited for in-pond use of a suctioning unit that has (in addition to a non-constrained length of electrical cord) an extended length of hose or tubing extending from the vacuum unit to a place outside the pond.

Despite the benefits of certain embodiments of the present invention that are designed for an operator to be in a pond/lagoon with the device, there are certain advantages attained by having a suctioning unit positioned on the edge of a pond/lagoon, rather than submerged and associated with the operator's hand-held suction tool, including the weight reduction accompanying having a powerful and heavy suctioning unit not associated directly with a submerged suction end of a tool. Thus, in one embodiment of the present invention, an extended hose of at least about 2 inches in diameter is provided, being at least about 15-20 feet or more in length, having a suction head designed to be in proximity to a pond/lagoon bottom, and having an operator held portion that is above the suction head portion and prior to the extended hose portion. In one embodiment, there are handles associated with the operator held portion of the device, but in others, the operator merely holds a rigid tube having a diameter of at least about 2 inches, which is in alignment with the suction head portion and the extended hose connection.

In one embodiment, the above described operator held unit, sans any submersible vacuum unit connected to the suction head portion, is further provided with a pond/lagoon contacting device to facilitate the operator's ability to manipulate the suction head portion in a desired fashion. For example, a single wheel, single ski, etc. can be associated with the operator held unit to provide support for the unit and to facilitate ease of quickly turning the unit (e.g. devoid of two or more wheels which restricts such facile movements).

In one embodiment, there is a shut-off control provided directly on the pump/vacuum or one of the associated segments, thus providing the operator of the device with the ability to cut either suction from being employed or to cease electric power being provided to the unit. Other embodiments also provide at least two different power levels for the device, thus providing the operator with the ability, while in the pond/lagoon, to adjust the power/suction degree to address certain environments or situations. For example, in situations where a particularly thick and dense area of pond/lagoon bottom sediment is encountered, the operator can adjust the power level to increase suction. A dial or lever-type device or gauge can be employed to achieve such control by the operator, such dial provided near a handle of the suctioning end.

In one embodiment, the apparatus comprises a vacuum device, such as a torpedo pump, positioned on a preferably wheel mounted assembly such that a user can push the device across the pond/lagoon floor while wading in the pond/lagoon (e.g. the user may be in a chest wader if the water is cold and the water level is up to about chest high.) While one wheel may be sufficient to provide movable support for the under-water carriage, two, three, four or more wheels, suitable to support various larger or heavier versions of units. In one embodiment, a vacuum device can be obtained from Cal Pump, preferably its Direct Drive Torpedo Pump with a capable throughput of about 4000 gph. As otherwise described below, the use of two or more pumps, one preferably submerged with the other outside the water and near the pond/lagoon, is contemplated in situations where additional suction power is desired.

In one embodiment, Cal Pump Direct Drive Torpedo Pumps energy efficient pumps may be employed, as they are water-cooled, use no oil, and may be used as submersible, in-line pumps. The size, power, capacity, dimensions, etc. of a vacuum device can vary dependent upon the job at hand, but preferably the vacuum is sufficient to draw in substantial amounts of silt and debris from the bottom of the pond/lagoon without damaging the underlying pond/lagoon surface or liner.

In particular, pumps similar to those available from Osae can be employed (see issued patents referenced below), especially for the vacuum unit positioned outside the pond/lagoon, thus facilitating the desired vacuum power to address the significant weight of water being suctioned out of the pond/lagoon. A number of other patents and published applications directed to technologies owned by Oase are also incorporated herein by reference to provide particular written disclosure of systems and methods applicable to various embodiments of the present invention, including the following: U.S. Pat. Nos. and publication nos.: U.S. Pat. No. 7,686,951; 20070065316; 20070183905; 20070199595; 20070286752; 20080054088; 20080044293; 20080056911; 20080105311; and 20080217229. Still other patents incorporated by reference herein include: U.S. Pat. No. 5,131,821 to Marioni; U.S. Pat. No. 5,314,619 to Runyon; U.S. Pat. No. 5,095,571 to Sargent; U.S. Pat. No. 7,270,746 to Wang; U.S. Pat. No. 7,708,149 to Pank et al; U.S. Pat. No. 7,465,129 to Singleton; and U.S. Pat. No. 5,553,972.

In certain embodiments, the selection of a pump or pumps to employ in a device or method of the present invention is achieved by reference to a pump curve. A pump curve is a simple graph which shows the performance characteristics of a particular pump. There is an inverse relationship between pressure and flow. Higher pressures mean lower flows. Lower pressures result in higher flows. Centrifugal type pumps are often used for irrigation and are preferred in many embodiments disclosed herein. Two variables affect the pump performance: horsepower of the motor attached to the pump, with bigger motors having more volume and pressure; and the size of the impeller. The pressure that the pump is capable of producing is typically measured in feet of head, rather than PSI. A pump is selected based on a size that will produce both the head and GPM desired, and thus involves selection of the horsepower and impeller size that will provide desired performance. Together the impeller curves and horsepower lines on a pump curve represent the best performance the pump is capable of if that horsepower or impeller size is selected.

In one embodiment, an aspirator similar to that described in U.S. Pat. No. 7,814,926, incorporated herein by this reference, is employed to address particular issues when pond/lagoon water is especially filled with sludge. Thus, in one embodiment, a liquid aspirator for liquids containing solids comprises a housing comprising a receptacle and a lid; at least one aspirator motor arranged in the housing; the receptacle enclosing at least two receiving chambers for liquid, each of the at least two receiving chambers having an air aspiration opening that is connected to a vacuum side of the at least one aspirator motor and is provided with a main valve; and a vacuum connector connected to the receptacle. Liquid is sucked into the receptacle through the vacuum connector with the at least one aspirator motor, wherein a section of the vacuum connector arranged inside the receptacle has for each one of the at least two receiving chambers a separate closeable opening so that the vacuum connector communicates separately with each one of the at least two receiving chambers, and a drainage is connected to the receptacle through which drainage liquid contained in the receptacle drains from the receptacle. A control acts on the main valves so as to alternatingly open and close the air aspiration openings so that the at least two receiving chambers are alternatingly filled with liquid through the closeable openings of the vacuum connector, respectively, and so that one of the at least two receiving chambers currently not being filled is drained.

In other embodiments, different types of vacuum units can be connected in series to address suction issues. For example, connection of one of the above referenced Osae pumps to a wet-dry vacuum (e.g. available from Black and Decker, Ace Hardware, etc.) facilitates having vacuum suction available on a more consistent basis was the water filling units of the Osae units fill and drain. Preferably, the Osae vacuum is the unit that is connected to hose that enters the pond and a dry vac unit is positioned nearby the Osae unit and has tubing that facilitates the exiting stream of water to either a filtration unit, surrounding ground or back into the pond.

With respect to suitable pumps for use with various embodiments, the following describes configurations and designs of pumps. For example, a pump of the type as is shown in U.S. Pat. No. 5,713,719 can be used, or any suitable pump that may include a rotary or centrifugal pump with an open impeller. The impeller may include pump wheel vanes, with a flow channel formed between the pump wheel vanes, one of the pump wheel vane carrying discs and a housing section. These flow channels expand in their cross section going from the radial inward side towards the outer side. Another variation is disclosed in WO 94/03731, incorporated herein by reference, which discloses a centrifugal pump with a non-dog impeller, in which the flow channels are defined between full pump vanes and extend from the rotation axis of the impeller to the radial periphery. Still others include those disclosed in US 2004/0126228, also incorporated herein by this reference, where an impeller pump with a special geometry of the spiral housing is shown. Centrifugal pumps are known from the general state of the art, which have a rotating impeller for conveying water. The pumps are usually employed by full emersion in the water to be conveyed (submersion pumps). The suction side can also be placed in communication with the water to be conveyed via a pump. Centrifugal pumps operate according to a hydrodynamic conveyance principal, where the water to be conveyed is supplied in the vicinity of the rotation axis of the impeller, is taken along with the rotating impeller with its thereupon located vanes and is forced to a circular or orbital track. By the centrifugal force acting upon the water rotating in the circular track the water is radially forced outward. Accordingly, a vacuum is produced close to the rotation axis at the water intake (suction side) and an over pressure is produced at the periphery of the impeller (pressure side). Centrifugal pumps are very reliable and with appropriate design of impeller and associated pump housing, water with solids can be conveyed. In a preferred embodiment, a self-priming centrifugal pump is used, examples of such pumps being disclosed in U.S. Pat. Nos. 6,409,478 and 6,783,330 issued to Carnes et al., which are incorporated herein by this reference.

In preferred embodiments, the impeller is designed as a so-called non-dog impeller. Non-dog impellers, however, have a somewhat poorer degree of effectiveness due to circulation short-circuits and internal pressure equalization in comparison to pumps with a closed impeller. Pumps with a closed impeller are, however, more susceptible to clogging, so that a correspondingly finer filter must be provided on the suction side, which provides a corresponding resistance on circulation. One of skill in the art will understand that one objective for a given project is to optimize a centrifugal pump with an open impeller to achieve an improved degree of effectiveness. Flow channels formed between the vanes are selected that have a cross-section that diminishes in the direction of flow from the radial inner side towards the outer side. The cross-sectional narrowing of the flow channels in radial direction from the rotation axis towards the outside brings about an increase in the centrifugal flow and herewith the hydrodynamic conveyance pressure. Preferably, the degree of narrowing at the flow channel is 15% to 40%, and more preferably 20% to 35%.

The degree of effectiveness of a pump may be increased when the height of the vanes of the impeller measured axially to the rotation axis decreases from the radial inner side towards the outer side, so that the open side of the impeller is spaced apart from a counterflow plate with an essentially even gap. To avoid clogging in the flow channels of the impeller by solid particles, the height of the vanes at the radial outer side is larger than or equal to the width of the flow channels. Further improvements may be achieved if the flow channels formed between the vanes have the same width from the radial inner side towards the outer side of the impeller. To avoid clogging, the width of the flow channels should be larger than or equal to the maximum permissible particle size. Also preferred are vanes having a sickle shaped cross section in the plane radial to the rotation axis to create a hydro-dynamically flow channel geometry.

Still other embodiments of the invention include the use of more than one suctioning device. For example, in one embodiment a vacuum device is submergible and associated with a suction end in close proximity to the pond/lagoon bottom (e.g. within 2 feet), and another vacuum unit is positioned either outside the pond/lagoon or in a separate location from the first suction device (e.g. also in the pond/lagoon). Thus, two separate vacuum units, connected in series, provide extra power in suctioning operations and facilitate the operator's ability to separately adjust suction rates, etc. for particular purposes. For example, the vacuum unit submerged in a pond/lagoon may be used primarily to suction leaves and larger debris and the bagging thereof, while the second remote pump/vacuum would serve the primary goal of sucking silt laden water out of the pond/lagoon for disposal or further treatment/filtering.

In one embodiment, a bag-type device is provided at the suction end of the device and is maintained in position so as to catch debris that would otherwise interfere with the vanes or impeller or other functioning features of a vacuum device. Thus, leaves, sticks, pine needles, rocks, etc. can be preferably entrapped in a mesh-like bag that permits smaller silt to pass through so that the silt and associated water is pulled through the vacuum device to exit through a tube and/or hose, thus exiting the pond/lagoon either onto soil, lawns, trees, — or alternatively into some type of filtering system (i.e. to separate water from the silt and debris prior to return to the pond/lagoon.)

In one embodiment where a bagging end is provided, the mesh bag is fitted such that it is sucked into the end-suction device, which preferably is shaped in a bowl or cone-like configuration to concentrate the suction power but to permit larger leaves, etc. to be sucked into the mesh and held there via the suction of the device. Silt vacuumed from the pond/lagoon bottom passes through the mesh and travels through the vacuum vanes/impeller and out the exit tube/hose. When the mesh bag is sufficiently full of leaves and other larger debris, it can be removed and replaced. One way to accomplish this is to provide a drawstring-like closure member on the external end of the water porous bag that can be cinched when the mesh bag is full or when the suction is adversely affected by the mesh being blocked by debris. After cinching of the bag, the leaves and debris are trapped and enclosed in the bag and can be dispended with by removing them from the pond/lagoon environment. In a variant embodiment, a diaper genie-type bagging system can be employed where successive mesh segments are generated via either a drawstring or cinching mechanism, or alternatively a twisting of the end of the mesh, thus enclosing larger debris so that it can be dispensed with, see e.g., U.S. Pat. No. 5,813,200 incorporated herein by this reference.

In one embodiment, a separate, out-of-the-pond/lagoon filter device is used to separate certain aspects of debris suctioned from the pond/lagoon. In one embodiment, leaves, sticks, stones, rocks, etc. far larger in size and denser than fine silt that is also suctioned, can be removed for separate disposal. A portable and reversibly collapsible unit, (e.g. similar to the Blagdon Monsta system's filter device) can be employed for such purpose. However, in a preferred embodiment of the present invention, a far more robust and effective filtering system is employed. In one embodiment, a two-part container system is used so that debris laden water is suctioned to a first container, the container being fitted with a permeable bag, preferably one having suitably sized apertures such that larger debris is retained in the bag but that smaller debris and silt containing water can readily pass there through, and can be directed out of the first container into a second container. The second container is fitted with appropriate filters such that a next smaller size of debris can be removed from the water. This process of directing suctioned water through two or more containers with successive filtering treatments to remove ever smaller debris, can be employed until a desired quality of water sans sediment, etc. is achieved. Preferably, however, and unlike certain prior art systems, the silt-laden water is not returned directly to the pond/lagoon after a single filtering step, e.g. where leaves and larger debris is removed. Instead, one aspect of certain embodiments is to provide at least two filtering steps with the objective being to remove a substantial quantity of silt from suctioned water prior to returning the water to the pond/lagoon.

In still other embodiments, where it is acceptable to irrigate surrounding land, return of the suctioned water is not accomplished and in fact, the silt laden water is believed to be especially beneficial to surrounding grass, trees, etc as a fertilizer. Replacement of cleaner water to the pond can be achieved via other means. In such a manner, a pond/lagoon owner is ensured that the majority of solid debris is removed from the pond/lagoon and that dirty water is not immediately returned to the pond/lagoon after only some larger debris is removed therefrom. This is considered a significant disadvantage of prior art systems.

Another aspect of the present invention relates to the ability to not only effectively suck up silt from pond/lagoon bottoms, but to also minimize the blocking of a suction device due to larger debris blocking the suction end. Various mesh-like covers on the suction end can be used, such as chicken wire, other metal matrices, fabric having desired porosity and filtering characteristics, etc. in a manner that the straining function of such features can periodically be cleaned.

One embodiment of the invention, called a "pond mower" due to its general visual similarity to a reel lawnmower, is pictured in the figures. While a one wheel support assembly is desirable and advantageous due to increased maneuverability, more than two wheels can be used, and it is believed that the stability and maneuverability of the device with two wheels is sufficient for most environments and uses. Other embodiments employ more than two wheels, slats, skis or other bottom surface supporting elements that ride upon the pond/lagoon bottom surface, etc., which can also be used in combination (e.g. wheeled and ski combos), in order to provide desired stability and to support other associated structures of the device. In particular, in some embodiments, the wheels directly support a silt constraining enclosure or housing. In others, the wheels support the heavier pump/vacuum unit that is submerged in the pond/lagoon. In still other embodiments, wheels are used to separately support the silt curtain/housing and other portions of the submerged unit, such as the vacuum unit, tubing, etc, thus, a plurality of wheels can be associated with the submerged portions of the unit to facilitate conveyance and avoidance of submerged obstacles, such as rocks, potted pond plants, etc.

For example, in one embodiment, it is desirable to provide an enclosure such that a certain predetermined area above (e.g., at least about ½ inch; more preferably about 1 inch and most preferably less than about 2 inches from the silt layer top to the descending silt curtain) but proximate to the silt layer sought to be removed is precluded from being disturbed in a manner that would otherwise cause silt to freely cloud the surrounding water. By using an enclosure (at least one) it is possible to constrain the degree of silt clouding and thus to suck a more concentrated silt and water content from the pond/lagoon. Preferably, the enclosure can be of a desired shape and size so that silt debris can be substantially contained within a region of the suction end of the device, for example, by providing side walls to an over-hanging ceiling member that traps disturbed silt within such enclosure for vacuuming into the device. In such embodiments, the suction end of the vacuum device is positioned such that it can exert suction within or under the enclosure. While a standard fitting or broad nozzle from, for example, a dry-vac device, can be employed at the suction end of the present invention, other more expansive covering enclosures can be employed. For example, a geometrically designed enclosure that is situated so that it extends from the suction end in a forward direction (e.g. the direction of travel) for at least about 6 inches, preferably at least about 12 inches and in some embodiments about two feet or more, such the an extended calm area is created above such enclosure and conversely, below such enclosure, silt is concentrated and confined to a significant degree within such enclosure, thus permitting the suction action to effectively remove concentrated silt containing water. The enclosure can be adapted to be reversibly attachable to the unit and in preferred embodiments is at least partially transparent so as to provide an operator desired visibility of the pond/lagoon bottom. Preferably, the extending portion of the cover is transparent to a degree and extent such that an operator's view of the bottom of the pond/lagoon through the pond/lagoon water is not entirely obscured by the extension itself.

In one embodiment, an inflatable extended segment (again, preferably having at least one transparent feature to provide viewing of the pond/lagoon bottom) is provided that provides a zone of quiet so that disturbed sediment is precluded from freely floating upwards or in undesired directions. In one embodiment, a shaped air-bladder is inflated to create a desired shelf under the water surface, preferably in close proximity to the suction end of the device, providing a quiet zone so that the operator can effectively suction fine debris below such shelf. In one embodiment, this may resemble a miniature version of a child's inflatable pool where a circumferential tube is inflated and suspends a connected extent of plastic or fabric there between. For some embodiments, such air bladders can also assist in generating desired buoyancy of the entire device, thus facilitating movement of the unit when in operation by lessening the weight and providing the ability to selectively adjust the distance of the suction end from the bottom of the pond/lagoon. Thus, in one embodiment, adjustability of the distance from the bottom of the pond/lagoon and the suction end can be achieved by provision of submarine-type leveling systems such that, for example, a higher powered (heavier) vacuum could be employed but the unit, instead of being within inches of the pond/lagoon bottom, may instead by adjusted to "float" above rocks plant tubs, etc. already on the pond/lagoon surface. In such a manner, an operator can far more efficiently and quickly clean debris from a pond/lagoon that has planted pots (i.e. water lilies, cattails, etc.) without the need to remove such pots from the pond/lagoon prior to cleaning of the pond/lagoon's bottom surface.

In a preferred embodiment, the vacuum device is electrically powered (e.g. like the Cal Pump unit described herein). The cord length can vary but should preferably be of a size that permits a pond/lagoon servicer or owner to traverse the entire pond/lagoon bottom with the minimum number of detachments and reattachments to different electrical outlets. Extension cords can be employed to provide desired length of cord, however, care must be taken with respect to interconnection of such cords as they may be immersed in water of the pond/lagoon. Thus, preferably the cord associated with the device is of a continuous length that permits the entire pond/lagoon bottom to be cleaned without the use of extension cords. In one embodiment, the cord is at least 40 feet in length. Electrical generators can be used to provide power in situations where outlets for electricity do not already exist. In a preferred embodiment, the electrical cord is closely associated with the non-suction segment of the device such that it is not encumbering the movement of the operator when the device is used. For example, the cord is mounted either along-side or in the interior of the exit tube so that the operator is to not prone to trip or tangle in the cord. Clips or a conduit associated with the exiting tube or hose of the invention such that it directs the cord in a fashion so that it is not free to tangle with an operator's feet, etc. is preferred. In other embodiments, at least sections of the electrical cord or hoses are buoyant or have buoyant devices associated therewith to permit the operator to know where the cord is during use, thus reducing the occasions where the cord could tangle the operator's feet or body if submerged in the water. Thus, in one embodiment, the cord/hose is provided with floating segments or is coated with a buoyant material along its entire extent, but at least preferably provided on the cord just after it exists the upper-non-suction segment (e.g. as the cord exists the unit and extends toward the power outlet outside the pond/lagoon.)

Other power sources can be employed, such as gas powered engines, etc. but electricity is the preferred mode of power, if only due to the quietness of the same, the ease of using electrically powered pump/vacuum systems tested and approved for use while submerged, etc.

In certain embodiments, either a water or air stream can be further provided to assist in the dislodging of sediment, for dispersing of sediment so as to improve visualization of underwater conditions, etc. Thus, in on embodiment, a valve can be used that directs a stream from the exiting water-stream (containing sediment therein) toward an area of interest of the operator. For example, if an operator wants to cleanse a submerged rock from debris residing thereon, a valve is opened to permit a directed stream of water to blow such sediment from the rock surface (e.g. like a spray-gun used for washing a car) and then the valve can be shut and the operator can suction up the sediment. An air bubbling stream can also be provided associated with the suction device to similarly utilize air instead of or in conjunction with water to remove and/or direct sediment in the water.

Although in one preferred embodiment, no powered movement mechanism is involved, other embodiments (e.g. especially those where more bulky or heavy units are involved) employ such powered conveyance to permit an operator from having to push or pull a vacuum device across the pond/lagoon bottom surface. Such a self-propelling feature can be of any suitable design and type, however, preferably the power would be electric (as the vacuum would similarly be powered) and systems similar to those employed on lawnmowers and/or rug or pool vacuums for similar purposes can be used, suitably adjusted to operate in submerged conditions.

In other embodiments, the system can be remote controlled in various respects, including directing the traveling of the unit across a pond/lagoon floor, directing the herein described bagging operations (e.g. using the diaper genie-type mechanism); adjusting the height of the unit above a surface of the pond/lagoon floor to address plantings, rocks, other obstacles, adjusting a silt curtain, etc. This feature is particularly beneficial in deep water where an operator may be up over their neck in water if attempting to physically and manually push and pull the device. While numerous pond/lagoons of a depth that an operator is able to manually enter the pond/lagoon to perform the present method albeit sometime perhaps necessitating a snorkel, other deeper water environments may require scuba gear or the use of the herein described remote control system. Remote control systems are well known an implementation in its various forms will be straightforward to those of skill in the art. Incorporated by reference herein for suitable types of remote control systems are the following: 20050040283 to Frazer; 20080119106 to Imai; U.S. Pat. No. 6,165,036 to Hino, et al.; 20100054961 to Palecek; U.S. Pat. No. 7,500,441 to Van-Zwol; and U.S. Pat. No. 7,290,496 to Asfar, et al.

One aspect of certain embodiments of the present invention relates to the conveyance of sediment containing water out of the pond/lagoon and to an outer pond/lagoon location. In one embodiment, the sediment laden water is conveyed through a flexible hose to a relatively close location outside of a pond/lagoon, such as neighboring lawns or trees where such nutrient rich water is a desirable fertilizer for the growth of grass, trees, etc. Alternatively, the pumped sediment laden water can be directed to simply another location outside of the pond/lagoon and the water can evaporate from another reservoir. Still other embodiments of the invention involve directing water through various filtration treatments such that water can be at least partially filtered such that it can be returned to the pond/lagoon from whence it came.

In other embodiments, more than one vacuum unit can be employed, especially if a wheeled or ski-track assembly is used to provide support for such a larger unit or units. In such embodiments, two, three or more vacuum units can be assembled such that broader swaths of a pond/lagoon bottom can be covered in successive passes by an operator. In one such embodiment, a two wheeled carriage is provided and two separate vacuum units (as described herein) are mounted thereon, preferably with controls provided that allow the operator to adjust each one for suction power, aperture opening sizes, speed of travel, etc. In certain embodiments, the vacuum units are connected in series to provide extra power, to provide for separation of different type or sixed debris, etc.

In a particular embodiment, a single ski or wheel is used to contact the pond/lagoon bottom surface, thus providing a degree of maneuverability that no prior art device possesses, while permitting the operator to raise the suction level above the pond/lagoon surface a predetermined degree. This allows, for example, one to vacuum the pond/lagoon bottom without hitting submerged underwater plant containers as the length of the ski or wheeled extension member (connected to the device itself) can be adjusted accordingly.

The suction area at the front of the unit, in one embodiment, is connected to the submersible pump having a capacity sufficient to remove a layer of sand and sludge up to at least about 1 inch thick. The suctioned material can be conveyed to a separate place outside the pond/lagoon where removed sand may be cleaned and if desired, later redeposited in the pond/lagoon, while the water-suspended sludge is discharged through a hose.

A wheeled, castored, or ski-slatted frame can be associated with a vacuum unit, with one end of the unit having a chamber that includes an aperture formed therein for receiving in use sediment and water proximate the bottom of the pond/lagoon as the apparatus moves along the bottom the pond/lagoon. A gate means can be employed to control the size of the aperture formed in the chamber thereby regulating the volume of water and sediment entering the chamber and to regulate the ratio of sediment to water entering the chamber. A motorized mechanism 40, preferably electrically powered, can be used to move the apparatus along the bottom of the pond/lagoon. Any number of devices can also be employed, if desired, to loosen sediment by scraping, plowing, etc. the bottom sediment proximate the aperture upon movement of the frame. A vent means can be used to vent the chamber to permit in use a flow into the chamber of sediment and water proximate the aperture.

One aspect of certain embodiments of the present invention include a bagging mechanism that permits an operator to remove larger debris from the pond/lagoon without having such material suctioned completely through an extended hose that runs outside the pond/lagoon. Instead, in one embodiment, the bagging mechanism is submersed in the pond/lagoon and the bagging activity occurs at least partially underwater. In such a manner, the difficulties in handling leaves and larger debris, including the wear and tear on impeller mechanisms of vacuuming and suctioning units, is reduced. In a particular embodiment, a diaper genie-type device is employed at about the suction end closest to the pond/lagoon bottom, used in association with special bagging material that is porous enough to permit large debris to be captured inside, while permitting a desirable amount of water and other smaller debris to pass therethrough. As shown in the Figures, the suction end can be designed to include a sealing mechanism for accumulated debris that is suctioned from the pond/lagoon. Such sealing mechanism can include a storage container having a body and a storage film cartridge adapted to be positioned in said body. The cartridge has a continuous length of storage film therein. A sealing mechanism comprises an actuator operably connected to the cartridge such that actuation of the actuator rotates the cartridge in only one direction causing said storage film to seal. A clutch is operably connected to the actuator and the cartridge, thus allowing the cartridge to rotate in only one direction. A rack gear is operably connected to the actuator and the clutch, and a spring is connected to the rack gear. Actuation of the actuator causes the rack gear to move in a first direction against the bias of said spring and release of the actuator causes the rack gear to move in a second direction under the bias of the spring to cause the clutch to rotate the cartridge.

One aspect of certain embodiments of the present invention is directed to removal of decayed matter, sludge, debris, unsightly algae, and prevents accumulation of waste materials from difficult to reach pond/lagoon bottoms, corners and dead spots. As one of skill in the art will appreciate, to advance the settling of suspended solids from water, various types of flocculants, chemicals, ultrasound devices, etc. can be employed. In one embodiment, large organic matter is trapped in a removable container, which can later be used as fertilizer in gardens and flowerbeds.

In the diaper genie-type bagging system described herein, a film cartridge having a hole concentrically located therein, is positioned in the container body. The film cartridge has a top surface from which a storage film extends and has a twist ring secured in the concentric hole of the cartridge. The storage film extends from the film cartridge, over and then down through the twist ring, down through the hole in the film cartridge and into the container body. Leaves and other larger pond/lagoon debris are suctioned through the twist ring and hole in the film cartridge, and into the storage film. As one will appreciate, while in a diaper genie a user pushes a soiled diaper down into a container body, through the twist ring, in the pond/lagoon environment at issue here, the container body and twist ring are directed towards the bottom of the pond/lagoon. The vacuum suction is provided such that the bag is sucked from the open end of the container body and the twist ring, away from the pond/lagoon bottom and directed along the suction path created. The bag is limited in the extent to which it can be sucked into the vacuum tube end, preferably no more than about one to two feet into the vacuum tube. After a desirable amount of leaves, pond debris is accumulated in the porous storage bag while suction is applied thereto, the twist ring can be turned to twist the bag material, thus sealing off the accumulated leaves and debris suctioned in the bag. In other words, the twist ring can be manually rotated by the user's hand, which causes the film cartridge and storage film to rotate, tying off and sealing the accumulated leaves/debris in the storage film. The storage film is preferably continuously fed from the film cartridge, preferably providing the operator with the ability to create at least three, preferably at least four and more preferably at least five separate twisted segments of at least about one foot in length, prior to having to the film cartridge exhausted of film material. While in one embodiment, the device requires the user to rotate the twist ring by hand to seal the storage film, in other embodiments, such a twisting action and consequent sealing of bag segments, can be accomplished with a powered (e.g. vacuum or electrically operated) mechanism to perform the sealing operation.

Another difference between the diaper genie device and the modified device used for pond/lagoon maintenance as described herein, relates to the provision of a way to take full bag segments out of the direct suction stream created by the vacuum means. Thus, in one embodiment, the twist ring has a slot therein such that once a full bag segment has been twisted and the leaves/debris contents are sealed therein, the twisted narrow portion of the bag can be slipped or fitted through the slit in the twisted ring, thereby moving the filled segment out of the direct path of suction. When a full sealed segment is thus removed from the path of suction, the suction force then exerts a vacuum force such that another segment of the porous film is sucked into the vacuum end of the device, thus permitting such new section to be filled with leaves/debris being suctioned into the container body, twisted ring aperture, etc. One will appreciate that several segmented bags can thus be formed, each filed with a certain amount of larger solid debris, all without the operator having to exit the pond/lagoon or cease the suctioning operation to refit bags to the end of the suctioning unit.

A pump of suitable size, but preferably one that handles at least about 4000 gph, more preferably at least about 5000 gph, and most preferably up to an beyond 10,000 gph is used, such pumps having an inlet port providing suction and an outlet port providing discharge. The inlet port of the pump is in fluid communication with the chamber to create in use a pressure lower in the chamber thereby forcing into the chamber the sediment and fluid proximate the aperture, often creating an inflow turbulence within the chamber to form a slurry comprising the bottom sediment and water. The outlet port of the pump is associated with a flexible hose that removes the slurry away from the pond/lagoon.

A conduit can extend to the atmosphere to release air held within the chamber and/or pump. In one embodiment, the unit also includes telescoping features that move vertically relative to the frame thereby enabling an upward or downward manipulation of the pond/lagoon suction end relative to the bottom of the pond/lagoon.

A separate aspect of the present invention is directed to pond/lagoon filtering systems that can be used with or independently with various embodiments of the pond/lagoon suctioning devices, methods and systems as set forth herein. For example, skimmer devices having an encasement with inflow, outflow ports, pump output portals, a plurality of filters arranged in a vertical side-by-side fashion; a filter net adjacent to the inflow port and molded supports surrounding the exterior portion of the encasement, are particularly novel as compared to existing prior art skimmer systems. Other figures disclose embodiments depicting a hinged lid device; a sludge trap in the bottom most portion of the interior of the encasement; sludge discharge ports, preferably at least two and positioned toward the relative center of the interior of the encasement and between vertically inclined filter pads; and a submerged pump unit with a threaded pump output positioned within the interior of the encasement.

In one embodiment, a method of the present invention is directed to maintaining large water bodies that have irregular and soft bottoms and plastic liners, such as artificial lagoons, in a manner that removes silt and debris that accumulates on the bottom of the very large water body in a far more energy efficient manner, as compared to methods employed in conventional centralized filtration systems, such as those employed via conventional swimming pool technologies, which use conventional filtration system filters that filter the entire water body from 1 to 6 times per day. By targeting the suctioning of large swathes of the bottom of large water bodies, employing the apparatus as described herein, it is possible to vastly reduce the financial outlay for the construction of such a large body of water (with a liner), as well as the considerable energy and financial requirements involved if one were to use traditional approaches in maintaining relatively clear water conditions, e.g. such as are seen with Olympic sized pools, etc., which have centralized filters, a variety of skimmers, dosing requirements of chlorine, etc.

Certain aspects of the present invention are direct to a method and apparatus for removing a layer of sediment which has settled on the bottom of a large water body that includes a structural frame configured to contain a bottom water flow and avoid a re-suspension of sediment outside the vicinity of the structural frame. The structural frame has a control zone configured for containing liquid and suspended particles dispersed during removal of bottom sediment in a suctioning area that is at least about 3 square feet. A sediment removing vacuum unit is operably associated with the structural frame to conduct a suctioned bottom water flow.

Preferably, devices for suctioning precipitated impurities are able to avoid re-suspension of the settled impurities and remove them, while at the same time being able to cover large surface areas in short periods of time. Various embodiments of the present invention are used for cleaning the bottom of artificial water bodies (lagoons), where generally the devices move through the bottom of the artificial water bodies suctioning the bottom water flow in order to remove settled debris. The various embodiments of the present invention are designed to suction small precipitated impurities produced at large artificial water bodies with bottoms covered with plastic liners that do not have centralized filtration systems. Embodiments of the present invention therefore allow for treating and maintaining large water bodies with surfaces larger than a half acre at low cost and without requiring centralized filtration systems.

In various embodiments, given the large size of the suction area employed to accommodate the cleaning of a plastic liner at the bottom of a large lagoon, the suction device is somewhat flexible and made from relatively lightweight materials (plastics) and thus facilitate the cleaning of a bottom surface of large artificial water bodies at a surface cleaning rate of over 300,000 square feet in a day.

Such a suction device is provided with appropriate support to minimize the dispersion and re-suspension of silt and debris on the bottom of lagoons. Certain embodiments of the present invention concentrate the suction power in discreet areas, and then such areas are connected operationally so that water filled with debris is removed and conveyed to an external filtration system that preferably is not attached to the suctioning device. A filtration system generally includes a pump to move water through the system.

Certain embodiments include a method and device that employs a movable suctioning device for suctioning silt and flocs produced by flocculants or coagulants from a bottom of large artificial water bodies that have plastic liners, thus avoiding the use of conventional centralized filtration systems and conventional swimming pool technologies. In certain embodiments the suctioning device is flexible in certain respects, extends over at least three square feet, and preferably at least about eight square feet, and possesses a structural frame, preferably with depending structures that assist in confining and/or containing silt from escaping the edges of the frame. Such depending structures may be curtains, brushes, barriers, etc. and may act to support the frame above the bottom of the large water body, with additional wheels (at least 4) positioned on the frame to provide support therefore.

Internal suction lines configured to conduct the suctioned bottom water flow from more than one suction point beneath the structural frame conduct the suctioned water through a pipe and out of the large body of water, with such water preferably being filtered and then returned to the large body of water.

In still other embodiments of the present invention, there are additional applications for the present method and apparatus, such as in water treatments that would benefit from the use of the present invention to reduce the amount of silt and debris that settles from large bodies of water, whether such large water bodies are from municipal water treatment centers, desalinization plants, etc. The present technology can be employed in both fresh water and saltwater environments to achieve the objective of reducing the amount of settled material on the bottom of a large body of water in a manner that reduces the overall costs and energy required as compared with prior art technologies currently being employed.

In various embodiments of the present invention, a method and system is employed that reduces solids that settle to the bottom of a large body of water without the need of filtering the totality of the water volume, but instead, only filtering a small fraction of the water that would otherwise be filtered using a conventional water treatment filtration system. Prior art methods and systems for maintaining a clean—and preferably visually clear—large water bodies—have involved the consumption of large amounts of energy and chemicals, which have adverse impacts on our environment. Current restrictions require improving the overall efficiency of processes, using technologies that meet stringent environmental requirements while minimizing the carbon footprint and environmental impacts. There are problems arising in the use of membranes to filter water, reflected in a shorter life and higher frequencies of maintenance and cleaning of the membranes, leading to higher costs of operation and maintenance.

One preferred embodiment of the present invention is directed a method of removing a layer of sediment which has settled on the bottom of a large body of water, such method including the provision of an apparatus that has a structural frame configured to contain a bottom water flow and to avoid a re-suspension of sediment outside the vicinity of the structural frame. Preferably, the structural frame comprises a control zone configured to contain liquid and suspended particles dispersed during removal of bottom sediment in a suctioning area that is at least about 3 square feet. The structural frame has at least 4 wheels to facilitate conveyance when the structural frame is submerged in a large water body. The structural frame is operably connected to at least one suction line configured to conduct a suctioned bottom water flow. The apparatus preferably has a silt constraining enclosure that surrounds the suctioning area, designed to assist. Such suctioning area is at least about three square feet, but may be far larger so as to cover a larger bottom surface of a large water body, thus making a suctioning operation more feasible. The structural frame preferably has one or more sections that direct silt laden water to at least one sediment removing vacuum unit. In certain embodiments, barriers, curtains, brushes, etc. can be employed to accomplish the isolation of an area of suctioning and at least 4 wheels are employed to assist in the support such silt constraining enclosures. The structural frame is connected via a long hose (at least about eight feet long, but often much longer) that preferably has a diameter of at least about two inches. Such hose is operably connected to at least one sediment removing vacuum unit, preferably located just outside of the large body of water. Preferably the one or more sediment removing vacuum units have one or more segments of PVC or plastic pipe that are at least 1 inch in diameter. The suctioned water with sediment therein is then passed through a filter, such filter being permeable to water and of a predetermined size to trap debris. Sediment removed from the filtered water is preferably contained, at least for some period of time, in a storage container. The filtered water is preferably then returned to the large body of water.

The foregoing has outlined rather broadly the more pertinent and important features of the present invention in order that the detailed description of the invention that follows may be better understood so that the present contribution to the art can be more fully appreciated. Additional features of the invention will be described hereinafter which form the subject of the claims of the invention. It should be appreciated by those skilled in the art that the conception and the specific embodiments disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

In this respect, before explaining at least one embodiment of the device and method herein in detail it is to be understood that the invention is not limited in its application to the details of construction and to the arrangement, of the components set forth in the following description or illustrated in the drawings. The invention is capable of other embodiments and of being practiced and carried out in various ways which will become obvious to those skilled in the art who read this specification. Also, it is to be understood that the phraseology and terminology employed herein are for the purpose of description and should not be regarded as limiting of the invention in any fashion.

As such, those skilled in the art will appreciate that the conception upon which this disclosure is based may readily be utilized as a basis for designing of other structures, methods and systems for carrying out the several purposes of the present invention. It is important, therefore, that the claims be regarded as including any such equivalent construction insofar as they do not depart from the spirit and scope of the present invention.

DETAILED DESCRIPTION OF CERTAIN EMBODIMENTS

Figure 1:
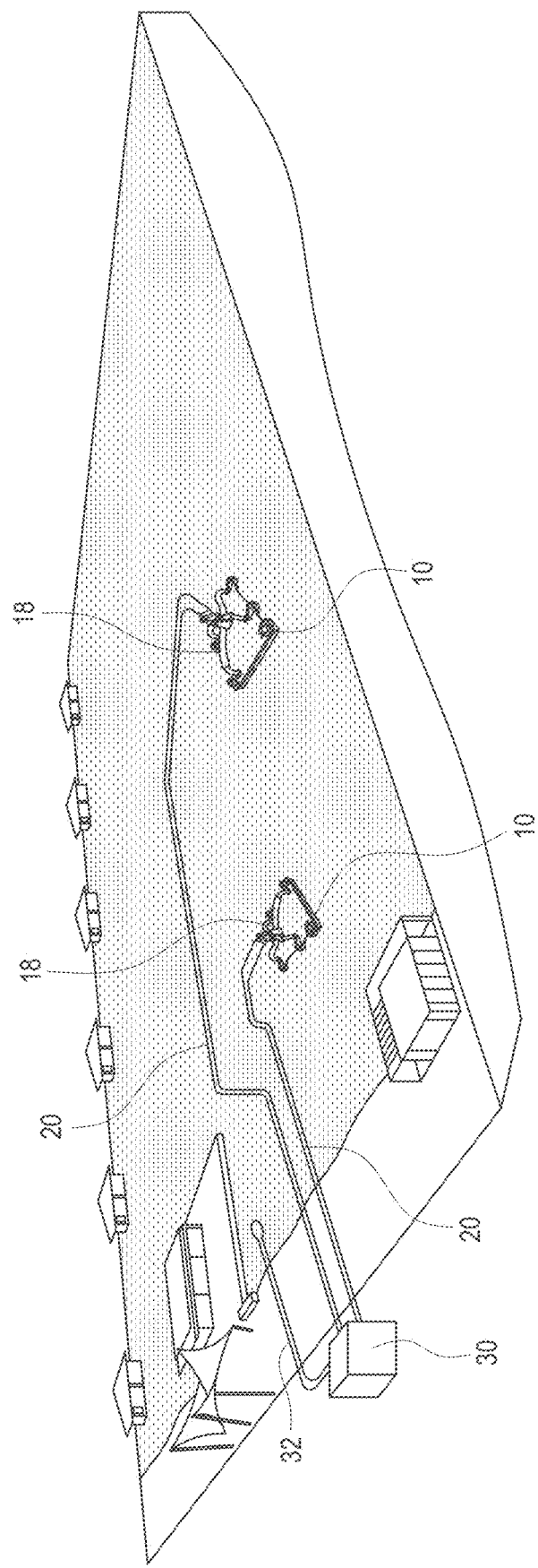
FIG. 1 shows a schematic, perspective view of one embodiment of the present invention, showing two submerged suction units in operation at the bottom of a lagoon.
Figure 2A:
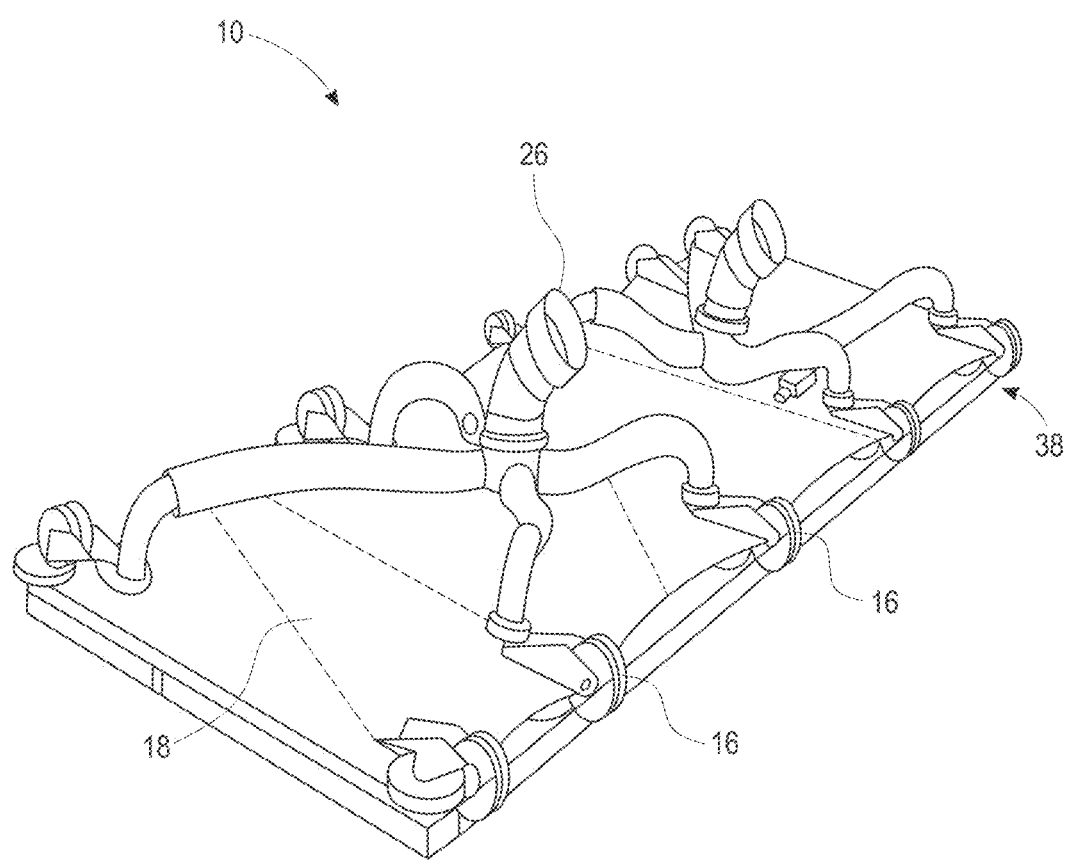
FIG. 2A shows a closer perspective view of one embodiment of a suction units shown in FIG. 1 as used in the present method.
Figure 2B:
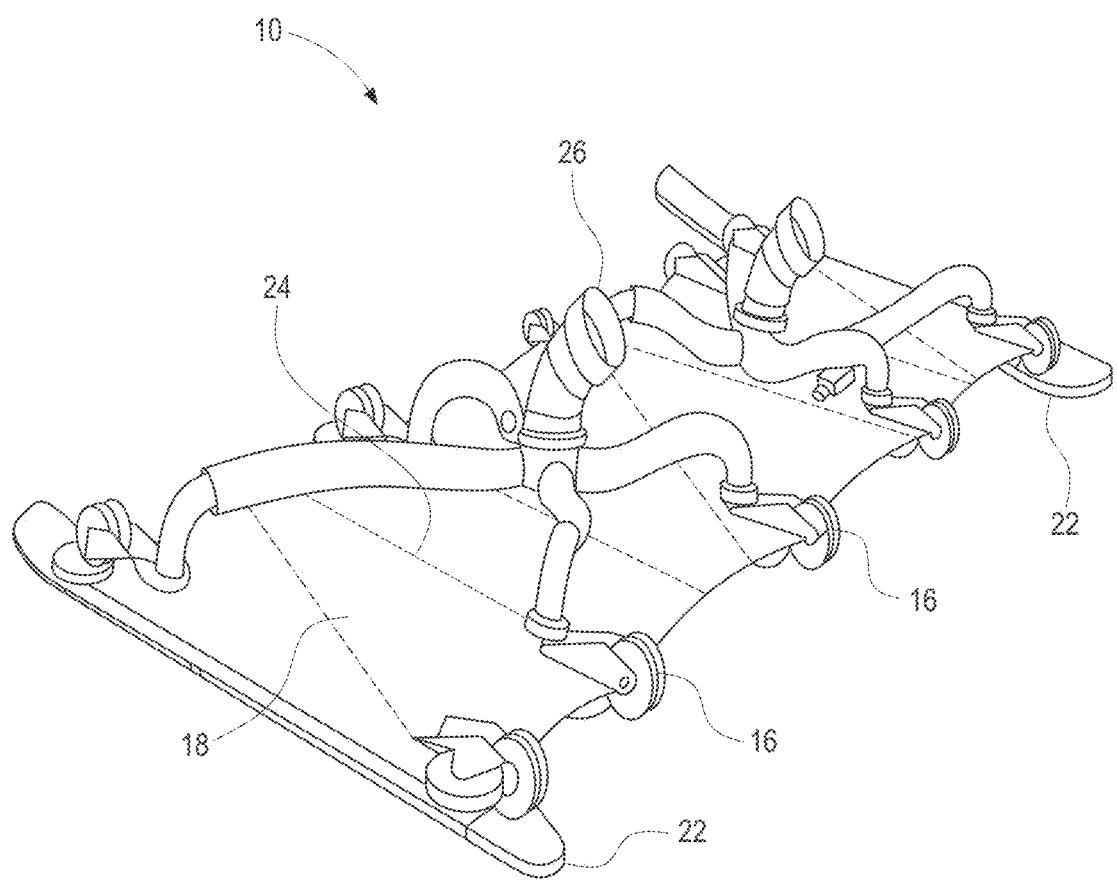
FIG. 2B shows an embodiment where skis are employed to support and convey the suction unit across the bottom of a large lagoon.
Figure 3:
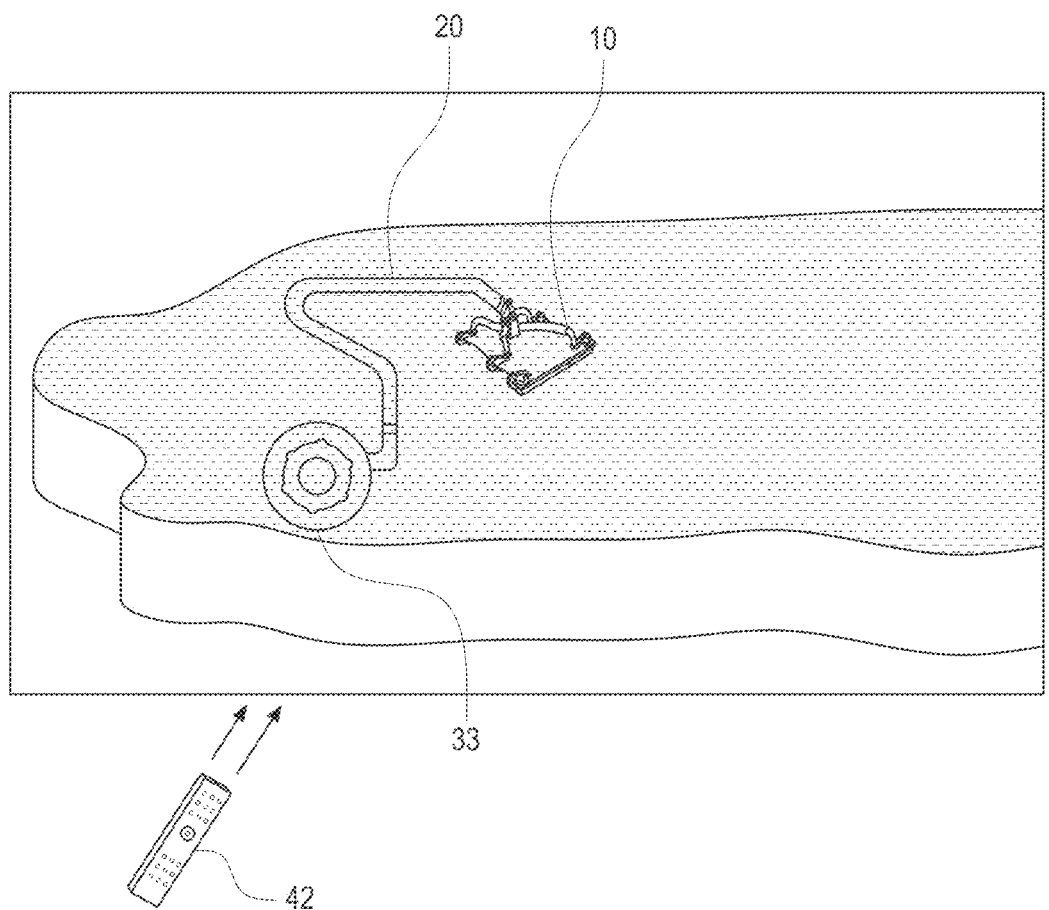
FIG. 3 is a perspective view of another embodiment where a submerged pump is employed with a long hose connected to a suction unit, with a remote control unit shown that is capable of controlling the suctioning operation.
Figure 5:
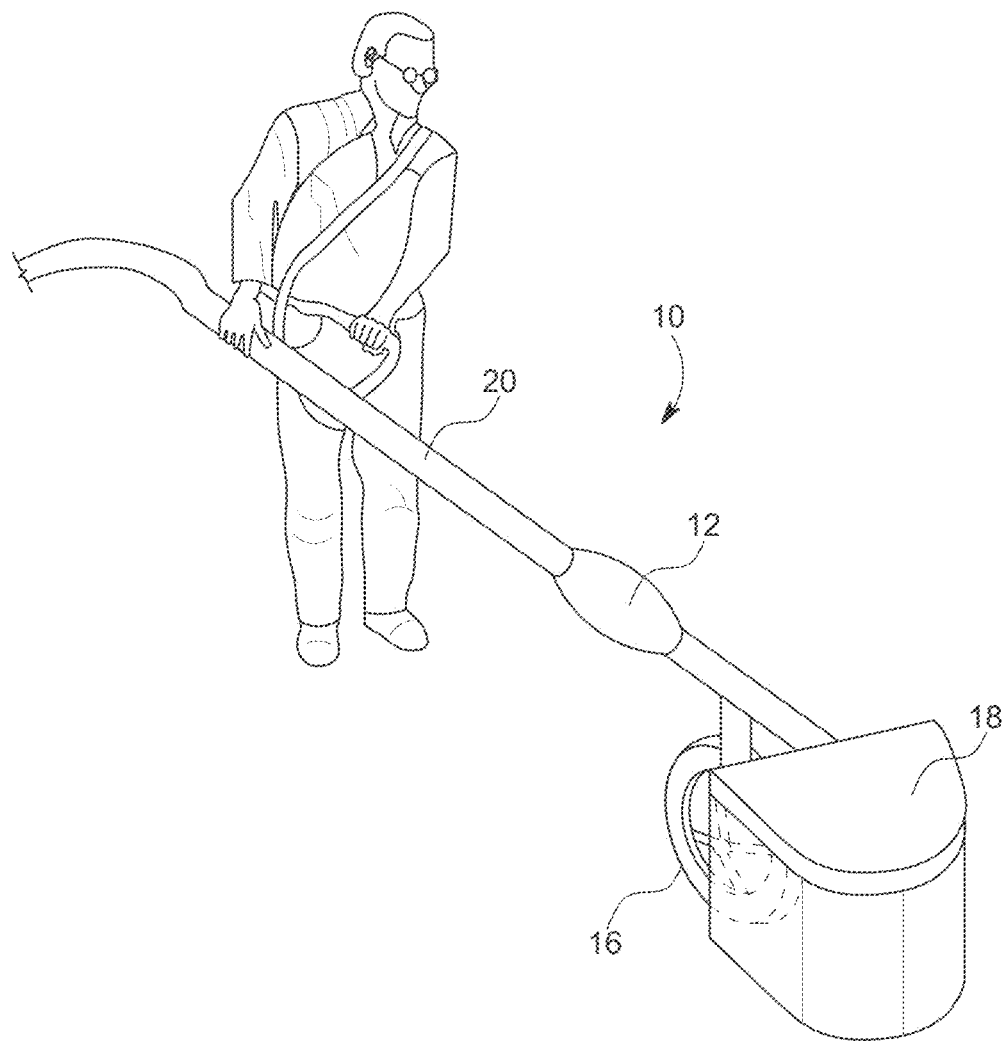
FIG. 5 is a perspective view of one embodiment where the suction unit is manually operated, employing a wheel and a silt curtain to perform the suctioning operation.

One embodiment of an apparatus of the invention 10 is shown in FIG. 5 in a working environment for removing a layer of sediment which has settled on the bottom of a pond/lagoon. The apparatus comprises a frame and a conduit for conveying slurry from a suction unit 10 (which may include an adjustment means to vary the size of apertures can be made to adjust the ratio of sediment to water removed from the bottom of the pond/lagoon). In certain embodiments, see FIG. 5, a single wheel 16 supports the unit and such unit is electrically powered via a long cord. As shown in FIGS. 2A and 2B, the suction unit 10 may include an inlet port/suction chamber 24 (underneath the housing 18) and an outlet port/discharge opening 26. Preferably, with respect to a manually operated version (see FIG. 5), the housing 18 is in fluid communication with a chamber 12, and then a flexible conduit/hose 20 is in fluid communication, which extends above the level of the pond/lagoon. FIG. 1 shows a perspective view of one embodiment of the present invention, showing two submerged suction units in operation at the bottom of a lagoon, where long extended hoses convey suctioned water to a filter, and where the filtered water is then returned to the lagoon.

Various patents and patent publications are hereby incorporated by reference to provide written description and support and for enablement purposes with respect to the varied and numerous embodiments of the present invention as encompassed by the scope of claims herein. These include U.S. Pat. No. 4,957,622 to Mims; U.S. Pat. No. 6,432,303 to Chesner; U.S. Pat. Nos. 7,370,445, 5,864,919 to Pineda; U.S. Pat. No. 5,317,776 to DeMoura; U.S. Pat. No. 7,314,571 to Lovestead et al; U.S. Pat. No. 7,234,657 to Doering et al; U.S. Pat. No. 4,454,993 to Shibata et al; 20080313827 to Paxton; 20050247613 to Bishop; U.S. Pat. No. 7,520,015 to Ajello; U.S. Pat. No. 7,552,551 to Kohutko; 20080109972 to Mah; U.S. Pat. No. 7,676,966 to Taplin; U.S. Pat. No. 6,383,383 to Novak; U.S. Pat. No. 4,642,919 to Werner et al.; U.S. Pat. No. 7,181,871 to Sower; and U.S. Pat. No. 6,953,321 to Roudnev et al.; U.S. Pat. No. 7,806,347 to Hanke et al.; U.S. Pat. No. 7,805,793 to Paxton; 20040111825 to Kaufman et al.; 20030221412 to Harrington; 20070190591 to Grech; 20100096324 to Roberts; U.S. Pat. No. 7,686,951 to Wagner, et al.; U.S. Pat. No. 7,270,746 to Wang; U.S. Pat. No. 7,708,149 to Pank et al.; U.S. Pat. No. 5,095,571 to Sargent; U.S. Pat. No. 7,465,129 to Singleton; U.S. Pat. No. 7,814,926 to Hoffmeier, et al. and United States Patent Application Nos. 20070065316; 20070183905; 20070199595; 20070286752; 20080054088; 20080044293; 20080056911; 20080105311; 20120024794 and 20080217229. U.S. Pat. Nos. 7,820,055; 8,070,942; 8,062,514; 8,790,518; 9,708,822; 9,470,007; 9,080,342; 8,465,651; 9,062,471; 8,753,520; 9,957,693 and 9,470,008 are also hereby incorporated by reference to provide further written support and enablement for various embodiments of the present invention.

Figure 4:
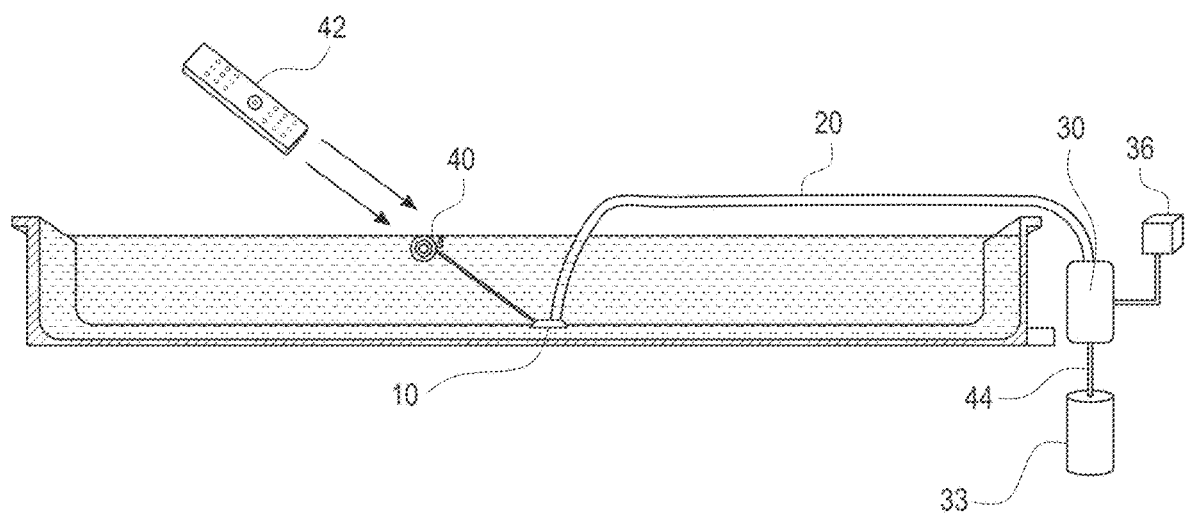
FIG. 4 is a side perspective view of a lagoon with a submerged suction unit at its bottom, a filter, pump and sediment container positioned outside the lagoon, and a motorized powered floating unit that is remotely controlled to achieve the suctioning operation.

According to another aspect of the present invention, a sediment removal system for removing sediment from a body of water comprises a suction conduit having an inlet portion defining an inlet opening/suction chamber 24, at least one retention container/filter 30 adapted to retain sediment removed from a body of water, and a suction pump 33 adapted to draw sediment and water through the suction conduit/hose 20 and into the at least one retention container/filter 30. A retention/storage container 36 (see FIG. 4) may also be employed to contain filtered sediment for later disposal.

In a preferred embodiment, the material that has settled to the bottom of the pond is not to be unduly disturbed before being suctioned, thus allowing more of the sediment to be removed and preventing further contamination of the pond water. Thus, the method of the present invention is particularly directed and focused to achieving in a controlled manner removal of debris from a pond/lagoon bottom without generating unwanted turbidity.

In still other embodiments, a mulcher-type of mechanism (not shown), similar to those employed in leaf blower systems, can be associated with the suction import end of the unit so that leaves and other debris that can be reduced in size (to a size that does not interfere with the impeller movement of the vacuum or pump employed). This provides a way to largely dispense with the herein described bagger mechanisms for large debris and leaves. In some embodiments, a combination of such systems can be provided on a unit so that the operator has options in what mechanisms can be employed for particular uses. Such mechanisms typically include vanes which provide serrations or debris-engaging structure for further mulching debris. Incorporated herein are the following patents for this particular aspect of the present invention: U.S. Pat. No. 6,629,818 to Svoboda; U.S. Pat. No. 5,791,568 to Keim and U.S. Pat. No. 5,794,864 to Hammett, et al.

Thus, in certain embodiments, a cutter pump (not shown) is employed to address mulching of debris so that impeller devices are not adversely affected by debris clogging the vacuum operation. Various types of pulverizing means for receiving said solids and for reducing the solids to particulate sizes can be employed. For example, water enters a chamber from an inlet, an aperture control the water flow as it leaves the chamber and enters a passageway, with such passageway controlling the water flow. Separated heavier solid waste settles into a sump and pre-filtered lighter suspended solid waste is carried by the water flow to be filtered by a filter member. A cutter pump (not shown) subassembly can be employed that is adapted for cutting and pumping a liquid containing entrained solids, such as slurry. Pumps of this kind are used to transport fiber suspensions and various sludges such as sewage, paper, cloth products, and plastics. Preferably, head capacity, i.e., pressure differential from suction to discharge, is maintained at desirable levels so that the chopping action does not unduly restrict the flow of the water.

Preferably, the cutting action is carried out in line with the natural flow of the water passing through the pump. Other embodiments, however can employ other pump systems, such as that disclosed in U.S. Pat. No. 4,145,008, issued to Wolferd and incorporated herein by this reference, where a pump is shown in which the chopping action of the pump is provided by a blade spinning perpendicularly to the direction of fluid flow.

Another aspect of the present invention in particular embodiments is directed to a carriage for facilitating the conveyance of a suctioning unit across the bottom of a pond/lagoon. Thus, provision of a wheeled 16 or slatted/ski 22 carriage (see FIGS. 2A and 2B) that can retro-fit existing suction devices, including those of the prior art as referenced herein, enables one to better accomplish the removal of silt and debris from the bottom of a pond/lagoon. For example, in one embodiment a sled having skis 22 is attached to the bottom side of a silt enclosure or housing 18 and comprises the combination of both surface conveyance devices, such as wheels 16, castors, slats or skis 22, etc. in combination with a vacuum unit 10 with a suction chamber 24 through which pond/lagoon bottom debris can be suctioned off the bottom of the pond/lagoon. Preferably such a carriage/housing 18 is employed with a submersible pump apparatus 33 positioned at the bottom of a body of water, whether such device is remotely controlled 42 (and thus does not necessitate a person actually entering the pond/lagoon to use the device)—or wherein an individual manually conveys the device across desired sections of a pond/lagoon bottom (see FIG. 5). In certain embodiments, the system can be remote controlled 42 in various respects, including directing the traveling of the unit 10 across a pond/lagoon floor bottom.

In other embodiments, where a water pump system 33 is employed that uses one or more powerful water intake units that remove or draw out massive amounts of water in a very short time, the pull or suction of water by these pumps 33 generates a high velocity water flow (vortex) near the pump intake unit 33. The high rate of water flow is sufficiently strong that aquatic life, such as fish, turtles, etc. cannot escape the water current generated, and are sucked into the pump system. Therefore, regrettably, during water pumping operations, water is not the only element removed, but in addition, fish and other aquatic life is also drawn out indiscriminately. Accordingly, preferred embodiments of the present invention uses a protective screen (not shown) to preclude aquatic life from being ingested into the pump stream. When the pumping rate of the water is increased, then the size of the screen is commensurately increased and thus, a large volume of water may flow over a larger surface area, neutralizing, maintaining, or in fact, reducing the actual approach velocity of the water near the protective screen, despite an increase in the rate of water pumped.

One will appreciate that while the present invention can be immersed and placed at the bottom floor of the body of water, it can also be floated by a buoyant or a floatation device (not shown). In one embodiment (see FIGS. 2A and 2B), downward-facing (via the housing 18) inlet ports/suction chambers 24 are configured as defined suction areas that are positioned to contain the suctioned water flow, and are suspended at an elevation above the bottom of the pond/lagoon, (depicted as dotted lines in FIGS. 2A and 2B), with such suspension adapted to be shortened or lengthened to adjust the height above the bottom of the pond/lagoon. In other embodiments, the buoyancy of the device may be changed to adjust the height above the bottom of the pond/lagoon.

In various embodiments, a portable frame comprising a screen (not shown) is employed to wrap around the portable frame, thus providing a low profile of the portable frame to permit drafting in shallow water situations, and decreases the overall weight of the device 10. Several various different embodiments of a suction unit 10 may be enclosed or housed within screened environments, thus facilitating the suctioning of silt and small debris without risking suctioning aquatic life and larger debris. Efficient removal of small particles is a critical component of any filtering system 30 when filtering cloudy water.

In another aspect of the invention, a method is provided for suctioning debris from the bottom of a pond/lagoon that comprises the acts of: submerging a suction system 10 having a screen (not shown) of a predetermined size that precludes aquatic life of more than about 1 inch in size from passing therethrough; elevating the intake/inlet ports/suction chambers 28 above the pond/lagoon bottom to a predetermined degree; connecting the outlet 26 via a hose 20 to first or second pump 33 located outside the pond/lagoon; and powering on the pump 33 to draw water upward through the system, thus achieving desired removal of silt laden water without substantial loss of aquatic life. In one embodiment, a submerged wheeled system 10 is adjustable for a height above the pond/lagoon bottom, with such system connected to hoses 20 or tubes and functionality connected to a separate power supply (not shown). The conveyance system preferably uses a removable ski 22, wheels 16, etc. (See FIGS. 2A and 2B) to customize the conveyance device, and may further include telescoping, locking, and adjustable height of wheels 16, skis 22, to position the suctioning action a desired distance above the bottom of the pond/lagoon. Such conveyance system facilitates one to be able to avoid unseen obstacles on the pond/lagoon bottom, such as rocks, aerators, potted plants, underwater structures, etc.

As described herein a housing 18 is particularly desired to entrap silt from going into surrounding waters. Thus, a housing 18 employing a type of a silt curtain/silt constraining enclosure 38 is designed to control the settling of solids (silt) to provide a controlled area of containment. Reduction of turbidity and confining it to a specified area around the suction device 10 has not been employed by prior art pond/lagoon suctioning systems. The use of such a silt containing housing 18 during suctioning operations provides for improved settling for suspended solids. Incorporated herein in their entireties by this reference are: U.S. Pat. No. 6,953,528; and U.S. Publication No. 20050016930 to Nesfield.

In certain embodiments, the present invention employs various known aspects of dredger designs to accomplish the particular purposes as set forth herein. For example, a Cutter Suction Dredger, Grab Dredger, Dustpan Dredger and trailing suction hopper dredgers can be variously employed.

In one embodiment, the above described suctioning device 10 (especially those that employ two or more pumping units 33) is used in conjunction with an elongate enclosure (not shown) having mesh sides and defining a closed interior for the collection of water and a mesh exterior for preventing undesired sized particulate penetration into the closed interior. Preferably a perforated plate arrayed over a cylindrical body is used where a housing comprising a screen for removing debris from water as water is suctioned from the bottom surface of a pond/lagoon, a suction chamber 24 positioned within the housing 18 and a discharge opening 26 for discharging water out of the suction chamber 24 to feed a suction pipe/hose 20 that is connected to a pumping unit 33. A control zone containing liquid and suspended particles dispersed during removal of bottom sediment surface is provided via a housing 18 that surrounds a desired suctioning area, preferably at least about 1 square foot around the suctioning action, more preferably about 2 square feet, and more preferably about 3 square feet around the suctioning action. Silt curtains and other silt constraining enclosures 38, such as transparent panels (not shown), are preferably employed to form around such housing 18 so as to facilitate some visual assistance of an operator of the suctioning unit 10. Such silt constraining 38 housing 18 may also have one or more sections/chambers 24 within the outer confines of the housing 18 to further reduce turbidity and to direct silt laden water to the suctioning unit outlet port 26. Thus, barrier walls/silt constraining enclosures 38 comprised of individual movable sheets capable of contouring to the bottom of the surface of the waterway can be used in containing liquid and suspended particles dispersed during suctioning operations. These features are designed to reduce sediment dispersion resulting from cutterblade, jetting, or raking mechanisms that may also be used in concert with the suctioning units 10 of the present invention. Various curtains 38 (flexible, impermeable canvas or rubber-like sheets) assist in isolating the area of suctioning.

Very large artificial water bodies are typically built without centralized filtration systems and there is, therefore, a need for providing low cost and efficient bottom cleaning methods and devices for very large water bodies, such as manmade lagoons, ponds, lakes, etc. whether they have natural bottoms, lined bottoms, or bottoms that permit only a limited amount of leakage. The present invention satisfies this need. In certain embodiments of the present invention, a method for removing a layer of sediment that has settled on the bottom of a large body of water employs a suctioning device 10 that employs a large (at least 3 square feet) expansive suction area configured to provide a structural frame having structures 24 that direct a bottom water flow within the suctioning device and that avoids the re-suspension of sediment from the bottom water flow in the vicinity of the suctioning device 10. A plurality of wheels 16 (e.g. at least four or more) are configured to provide support and/or suction height of the suctioning device 10. More than one apparatus can be employed at the same time in a lagoon (see FIG. 1) so as to speed up the suctioning operation of the entire lagoon.

The structural frame 18 of the apparatus 10 is operably connected to at least one suction output port or discharge opening 26, that is configured to conduct a suctioned bottom water flow through a suction line/hose 20, which conveys the suctioned bottom water flow and concentrate out of the water body where suctioned water can be filtered 30 and then returned 32 to the water body. Such hose 20 is operably connected to at least one sediment removing vacuum unit 33, preferably located just outside of the large body of water. Preferably the one or more sediment removing vacuum units 33 have one or more segments of PVC or plastic pipe 44 that are at least 1 inch in diameter. The suctioned water with sediment therein is then passed through a filter 30, such filter 30 being permeable to water and of a predetermined size to trap debris. Sediment removed from the filtered water is preferably contained, at least for some period of time, in a storage container 36. The filtered water is preferably then returned 32 to the large body of water.

In preferred embodiments, methods and devices are employed for suctioning precipitated impurities in a manner that avoids re-suspension of the settled impurities and doing so while being able to cover large surface areas in short periods of time. Preferred embodiments employ a method using a suctioning device 10 designed for cleaning the bottom of artificial water bodies, where the devices move along the bottom of the artificial water bodies, suctioning the bottom water flow in order to remove any solids found on the bottom thereof.

In contrast to prior suction technologies that employ long and thin suction openings that often create sediment clouds that generate cleaning and suctioning inefficiencies, the embodiments of the present invention are configured to have much larger suction areas, such as at least about 3 square feet, and preferably even larger, such as 8 square feet, to accomplish desired suctioning of the bottom surfaces of very large bodies of water. Preferably, embodiments of the present invention 10 are relatively light in weight as compared to prior art suctioning devices, preferably light enough not to deform the bottom surface of a large body of water. Preferred embodiments provide a suction method and device able to efficiently suction the debris from the bottom of a large body of water at high speed and over irregular bottoms, without relying upon a centralized filter system such as those used in traditional pools.

Very large artificial water bodies may have plastic liners over the natural terrain that may be covered with sand, clay, or compacted materials, which generates an irregular bottom, with some of such bottoms leaking certain amounts of water therethrough. Various embodiments of the present invention are directed to methods and systems that employ a large suctioning device 10 for suctioning debris from the bottom of large artificial water bodies with bottoms having plastic liners that do not have centralized filtration systems.

Preferably, the method and apparatus 10 employed uses a suctioning system that is supported, either with structures like curtains 38, wheels 16, brushes, etc., to enable the suction device 10 to suction up and also confine sediments so that there is a reduction in the dispersion and re-suspension of settled debris. In one embodiment, the suctioning device 10 is at least about three square feet in area, but is able to further concentrate suction power by using a series of suction points/chambers 24. The suctioning apparatus 10 is connected to suction lines 20, preferably at least about 2 inches in diameter and that are directed towards a suctioning vacuum device 33, itself connected to a filtration system 30 outside of the large body of water.

The suction device 10 can be provided with a plurality of structures/chambers 24 to allow for the redirecting of a bottom water flow to achieve efficient suction of the bottom water flow. The geometry and strategic placement thereof can vary and may include structures, such as curtains 28, barriers, etc. configured and positioned to contain the suctioned water flow within the suction device 10 to avoid re-suspension of a bottom water flow in the vicinity of the suction device 10.

In certain embodiments, a mobile suction device 10 as described herein is used to suction a portion of water containing debris to prevent the thickness of settled material on the bottom of a large body of water from exceeding at least 3 millimeters, more preferably more than 5 mm. Such suctioned water is filtered outside the large body of water and then the filtered water is returned 32 to the large body of water. The energy required to suction and filter such water is a fraction of the energy it would take for the same amount of water running thorough a typical pool centralized filter system.

In some embodiments, the suction unit 10 is large and flexible, making it easier to conform to the bottom surface of a large water body. The suction unit preferably has structures, such as inlet ports/suction chambers 24 (depicted as dotted lines beneath the housing 18 in FIGS. 2A and 2B), configured and positioned to contain the suctioned water flow within a defined suction area in a manner that assists in avoiding re-suspension of sediment from a bottom water flow in the vicinity of the suction unit 10.

The present disclosure includes that contained in the appended claims as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention.

What is claimed is:

1. A method of removing a layer of sediment which has settled on a bottom of a large body of water, the method comprising, providing an apparatus that comprises, a structural frame configured to contain a bottom water flow and avoid a re-suspension of sediment outside a vicinity of the structural frame, said structural frame configured to contain liquid and suspended particles dispersed during removal of bottom sediment in a suctioning area that is at least 3 square feet, said structural frame having at least 4 wheels configured to facilitate conveyance across the bottom of the large water body when the structural frame is submerged in the large water body; said structural frame operably connecting to at least one suction line that is at least about 8 feet in length and has a diameter of at least about 2 inches and configured to conduct a suctioned bottom water flow through said suction line; said apparatus having a silt constraining enclosure that surrounds the suctioning area that is at least about 3 square feet and that assists in isolating an area of suctioning; said structural frame having one or more sections that direct silt laden water to an at least one sediment removing vacuum unit; suctioning sediment-containing water from the bottom of the large body of water using the apparatus; and filtering the suctioned bottom water outside of the large body of water through a filter that is permeable to water to trap debris.

2. A method of removing a layer of sediment which has settled on a bottom of a large body of water, the method comprising, providing an apparatus that comprises, a structural frame configured to contain a bottom water flow and avoid a re-suspension of sediment outside a vicinity of the structural frame, said structural frame configured to contain liquid and suspended particles dispersed during removal of bottom sediment in a suctioning area that is at least 3 square feet, said structural frame having at least 4 wheels configured to facilitate conveyance across the bottom of the large water body when the structural frame is submerged in the large water body; said structural frame operably connecting to at least one suction line that is at least about 8 feet in length and has a diameter of at least about 2 inches and configured to conduct a suctioned bottom water flow through said suction line; said structural frame having one or more sections that direct silt laden water to an at least one sediment removing vacuum unit; suctioning sediment-containing water from the bottom of the large body of water using the apparatus in a controlled manner to achieve removal of debris from the bottom of the large body of water by confining turbidity to a specified area around the suction device; and filtering the suctioned bottom water outside of the large body of water through a filter that is permeable to water to trap debris, and providing a motorized, electrically powered mechanism to move the apparatus along the bottom of the large body of water.

3. The method as set forth in claim 2, wherein the electrically powered mechanism is remote controlled.

4. The method as set forth in claim 1, wherein the apparatus further comprises at least one ski.

5. The method as set forth in claim 1, wherein the at least 4 wheels support the silt constraining enclosure.

6. The method of claim 1, wherein said at least one sediment removing vacuum unit has at least one segment of PVC or plastic pipe being at least 1 inch in diameter.

7. The method of claim 1, wherein said debris is directed to a storage container.

8. The method of claim 1, further comprising, after said step of filtering, returning filtered water flow into the large water body.

9. The method of claim 1, further comprising loosening the layer of sediment upon movement of said apparatus by employing a rake having a plurality of prongs extending into a sediment layer of said large water body.

10. The method of claim 1, further comprising providing a fitting associated with the at least one sediment removing vacuum unit that precludes undesired sizes of debris from passing through when said vacuum unit draws sediment and water.

11. The method of claim 1, wherein said silt constraining enclosure is capable of contouring to the bottom of the large water body.

12. The method of claim 1, wherein said at least one sediment removing vacuum unit comprises at least one pump configured to pump water at a rate of at least 4000 gph.

13. The method of claim 1, wherein said structural frame has at least two sections that direct silt laden water to the at least one sediment removing vacuum unit.

14. The method of claim 1, wherein the silt constraining enclosure includes a silt curtain that is flexible.

15. The method of claim 1, wherein the at least one vacuum unit weighs at least 45 pounds.

16. The method of claim 1, wherein an elevation of said structural frame above the bottom of the large water body is adjustable.

17. A method of removing a layer of sediment which has settled on a bottom of a large body of water, the method comprising, providing an apparatus that comprises, a structural frame configured to contain a bottom water flow and avoid a re-suspension of sediment outside a vicinity of the structural frame, said structural frame configured to contain liquid and suspended particles dispersed during removal of bottom sediment in a suctioning area that is at least 3 square feet, said structural frame having at least 4 wheels configured to facilitate conveyance across the bottom of the large water body when the structural frame is submerged in the large water body; said structural frame operably connecting to at least one suction line that is at least about 8 feet in length and has a diameter of at least about 2 inches and configured to conduct a suctioned bottom water flow through said suction line; said structural frame having one or more sections that direct silt laden water to an at least one sediment removing vacuum unit; suctioning sediment-containing water from the bottom of the large body of water using the apparatus; and filtering the suctioned bottom water outside of the large body of water through a filter that is permeable to water to trap debris, wherein said apparatus further comprises a silt constraining enclosure that surrounds the suctioning area that is at least about 3 square feet and that assists in isolating an area of suctioning.

18. The method as set forth in claim 17, wherein the apparatus is moved along the bottom of the large body of water by remote control.

* * * * *